United States Patent [19]

Rehberg et al.

[11] Patent Number: 4,920,205

[45] Date of Patent: Apr. 24, 1990

[54] PROCESS FOR MAKING AZO PIGMENTS

[75] Inventors: Heinrich Rehberg, Brühl; Hartmut Behringer, Erftstadt, both of Fed. Rep. of Germany

[73] Assignee: Hoechst Aktiengesellschaft, Fed. Rep. of Germany

[21] Appl. No.: 329,647

[22] Filed: Mar. 28, 1989

Related U.S. Application Data

[63] Continuation of Ser. No. 40,338, Apr. 20, 1987, abandoned.

[51] Int. Cl.$^5$ .................... C09B 29/38; C09B 35/08; C09B 37/00; C09B 41/00
[52] U.S. Cl. .................................. 534/582; 534/575; 534/583; 534/739; 534/839; 534/863; 534/876; 534/887
[58] Field of Search ......................................... 534/582

Primary Examiner—Floyd D. Higel
Attorney, Agent, or Firm—Connolly & Hutz

[57] ABSTRACT

Azo pigments are made by subjecting a diazo component to an azo coupling reaction with the equivalent quantity of a coupling component difficultly soluble at less than 65° C. in the aqueous/acid and aqueous/netural pH-ranges. More specifically, an aqueous/alkaline solution of the coupling component is continuously mixed in a first reaction step with an aqueous solution of acetic acid, boric acid, phosphoric acid, hydrochloric acid or sulfuric acid at a temperature lower than 65° C. within a period of less than 1 minute, during which the coupling component commenences precipitating at least partially as reactive matter; next, the suspension obtained is continuously mixed, in a second reaction step immediately following the first reaction step, with an aqueous/acid solution of the diazo component at a temperature of less than 65° C. within a period of less than 1 minute, and a predetermined pH between 2 and 9 is established by controlling the flow of the mass streams of diazo component and coupling component whereby a portion of the coupling component is caused to undergo immediate reaction to the azo pigment to be made; the balance portion of the coupling component is ultimately reacted in a postreaction phase with unreacted diazo component to the azo pigment to be made.

6 Claims, 1 Drawing Sheet

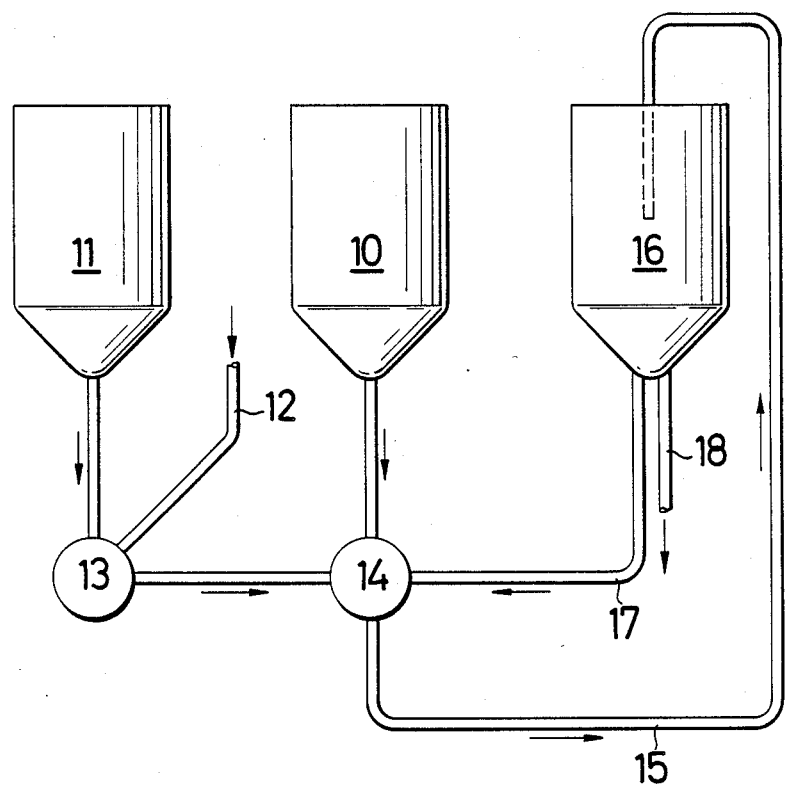

PROCESS FOR MAKING AZO PIGMENTS

The present application is a continuation of application Ser. No. 40,338, filed Apr. 20, 1987, now abandoned.

Azo pigments are made, preferably by subjecting a diazonium compound to an azo coupling reaction with a coupling component, such as an aromatic amine, acetoacetic acid arylide, naphthol, phenol or pyrazolone. This is commonly done by mixing the feed materials in aqueous phase. Reactions of this kind have long been known and described in textbooks of organic chemistry (cf. e.g. Louis and Mary Fieser, Organische Chemie, Verlag Chemie, Weinheim/Bergstrasse, 1965, pages 890 et seq., 1431, 1766 et seq.).

The coupling of components difficulty soluble in an aqueous system raises special problems. To undergo reaction, it is necessary for such coupling components to be distributed as finely as possible. This is done by adding a dispersant, emulsifier or solvent, e.g. an alcohol, or by grinding or precipitating the coupling components which are soluble in strongly alkaline media and can be precipitated by the addition of an acid. The difficult solubility of the coupling component often leads to occlusions in the pigment; as is known, the difficulty of producing pure pigments increases with a decreasing solubility of the pigment in the reaction system.

Normally, the diazonium salt solution stabler in the acid pH-range is allowed to run into the solution or suspension of the coupling component; the acid set free during the azo coupling reaction and the excess acid present in the diazonium salt solution are neutralized by adding a base so as to maintain a prdetermined pH. At the feed inlet for the acid diazonium salt solution, there is always a pH-value different from that which establishes after mixing, and agitator kind and agitation velocity also influence the formation of by-products and ultimately the coloristic properties of the pigment to be made. In order to avoid side reactions, care is always taken to ensure that the reaction mixture remains free from diazonium compound in excess.

We have now unexpectedly found that pure azo pigments free from occlusions of unreacted coupling component can be reproducibly obtained by very rapidly mixing, under certain reaction conditions, equivalent quantities of an aqueous/acid-diazonium salt solution with an aqueous reactive suspension of a coupling component difficulty soluble in the aqueous/neutral to aqueous/acid pH-range. A difficultly soluble coupling component is one having a solubility of less than 0.1 wgt % at pH 7.

The present invention provides more particularly a process for making azo pigments by subjecting a diazo component to an azo coupling reaction with the equivalent quantity of a coupling component difficultly soluble at less than 65° C. in the aqueous/acid and aqueous/neutral pH-ranges, which comprises: continuously mixing in a first reaction step, an aqueous/alkaline solution of the coupling component with an aqueous solution of an acid selected from the group consisting of acetic acid, boric acid, phosphoric acid, hydrochloric acid or sulfuric acid at a temperature lower than 65° C. and within a period of less than 1 minute, during which the coupling component commenences precipitating at least partially as reactive matter; continuously mixing, in a second reaction step immediately following the first reaction step, the suspension obtained with an aqueous-/acid solution of the diazo component at a temperature of less than 65° C. within a period of less than 1 minute, and establishing a predetermined pH between 2 and 9 by controlling the flow of the mass streams of the diazo component and coupling component and thereby causing a portion of the coupling component to undergo immediate reaction to the azo pigment to be made; and reacting the balance portion of the coupling component in a post-reaction phase with unreacted diazo component to the azo pigment to be made.

Further preferred and optional features of the process of this invention provide:

(a) for the continuous mixing to be effected over a period of less than 6 seconds, in the second reaction step;

(b) for a buffering substance contributing to establishing the predetermined pH to be added during the second reaction step;

(c) for 60 to 98% of the coupling component to undergo immediate reaction to the azo pigment to be made, in the second reaction step;

(d) for the temperature during the azo coupling reaction including the post-reaction phase to be 10° to 55° C. during the second reaction step;

(e) for the reactive coupling component precipitated during the first reaction step, depending on its chemical composition, to have an enolate, phenolate or naphtholate-group fixed to the surface of its particles.

The first processing step of this invention comprises mixing an aqueous/alkaline-solution of the difficultly soluble coupling component within a period of less than 1 minute with an aqueous, optionally buffering acid solution at temperatures of less than 65° C., the resulting pH-value being within the weakly acid to alkaline range (pH 4–11). During that operation, at least a portion of the difficultly soluble coupling component is precipitated as reactive matter which is more reactive than the particles of the pure coupling component. Depending on the chemical nature of the coupling component, the regular finely crystalline particles have a phenolate, enolate or naphtholate group, fixed to their surface, which acts upon the electron density within the crystalline particles and renders them especially reactive.

Immediately after the mixing operation during which coupling component is precipitated, the resulting aqueous suspension is mixed with the equivalent quantity of an aqueous/acid-diazonium salt solution at a temperature of less than 65° C. and within a period of less than 1 minute, the resulting pH-value varying between 2 and 9. Establishing an even narrower range depends on the diazo component and coupling component selected and the particular product to be made. It is however allowable or even obligatory for the pH selected to be the higher within the limits specified the stabler the diazo component and the lower the solubility of the coupling component in the neutral range.

A portion of the azo pigment to be made is formed immediately on mixing the feed materials, and another portion is formed in a post reaction phase, depending on the specific properties of the feed materials, from diazo compound still present and coupling component precipitated as reactive matter. Although an excess of diazo component has long been held highly undesirable, we have unexpectedly found that within the pH- and temperature ranges specifically selected in this invention for the less than 1 minute rapid mixing of the feed components, the diazonium component is substantially not liable to undergo decomposition during a 0.01–1 hour period which is sufficiently long for the precipitated reactive matter portion of the coupling component to become completely coupled in a post-reaction phase, which varies between 0.01 and 1 hour, depending on the product to be made. It is often advantageous for a portion of the product coming from the mixer to be recycled, through an intermediate container, if desired, in order to promote the mixing and regulate the residence time of the material in the mixer.

Suitable feed materials for making the diazo component are e.g. 2,5-dichloroaniline; 2-chloro-4-nitroaniline; 5-nitro-2-aminoanisole or 3-nitro-4-aminotoluene. The useful coupling components should preferably be selected e.g. from 2-hydroxy-3-naphthoic acid anilide; β-naphthol or acetoacetic acid-o-aniside.

EXAMPLE 1 (cf. accompanying drawing)

Preparation of 2-(2-methoxy-4-nitrophenylazo)-N-(2-methoxyphenyl)-3-oxobutane imide of the formula

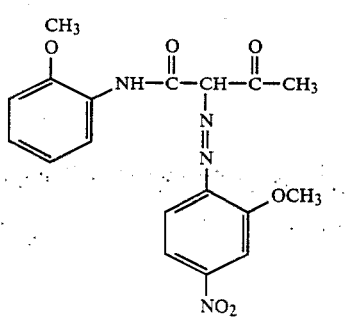

134 g (=0.80 mol) 5-nitro-2-aminoanisole of the formula

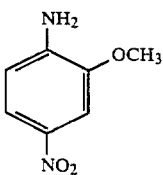

was suspended in 250 ml water and 210 ml hydrochloric acid (31 wgt %), the suspension was cooled by adding 400 g ice and diazotized at 5°–10° C. with 113 ml sodium nitrite solution (40 wgt %). 5 g filter aid and clarifying agent (kieselguhr and active carbon) were added, the solution was filtered and made up with ice water to 2 liters in container (10). Next, the nitrite in excess was practically completely decomposed by adding amidosulfuric acid (aminosulfonic acid H₂N—SO₂OH).

172 g (=0.83 mol) acetoacetic acid-o-anisidide of the formula

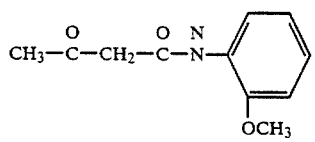

was suspended in 530 ml water and dissolved by adding 200 ml sodium hydroxide solution (25 wgt %). The solution was cooled to 10° C. and made up with water to 1000 ml. Within 2 hours, this solution from container (11) was introduced jointly with a mixture (coming from line 12) of 152 ml acetic acid (60 wgt %) and 400 ml water into mixer (13). Dilute acetic acid was added as a buffering substance in quantities monitored by means of pH-probe near the outlet of mixer (13) so as to have a pH of 5.5. A portion of the coupling component precipitated as reactive matter.

The material coming from mixer (13) was introduced into mixer (14) and mixed therein within 2 hours at 10° C. with the diazonium solution coming from container (10). The product leaving mixer (14) was introduced through line (15) into collecting tank (16). The residence time in each of mixers (13) and (14) was 1 second.

The mixing operation in mixer (14) was promoted by means of a stream of auxiliary material recycled from collecting tank (16) through recycle line (7) into mixer (14); the auxiliary material was used in a quantity (by volume) ten times larger than the quantity (by volume) of the diazonium salt used per hour. The pH in collecting tank (16) was 3.6 and the temperature was maintained at 10° C. by adding ice.

After all materials from containers (10) and (11) and line (12) had been added, the batch in collecting tank (16) was allowed to undergo post-reaction for 20 minutes at 20° C. until diazo compound was no longer detectable.

The azo pigment taken from collecting tank (16) through line (18) by filtration, and dried at 100° C. (302 g=0.78 mol) was free from occluded coupling component and had a coloring strength 10% stronger than that obtainable by conventional methods.

EXAMPLE 2 (cf. accompanying drawing)

Preparation of 1-(2-nitro-4-methylphenylazo)-2-hydroxynaphthalene of the formula

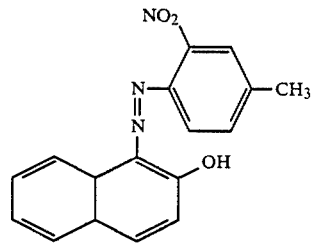

80 g (=0.526 mol) 3-nitro-4-aminotoluene of the formula

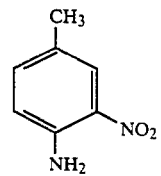

was suspended in 500 ml water and 126 ml hydrochloric acid (31 wgt %) and the suspension was diazotized at 5° C. with 69 ml sodium nitrite solution (40 wgt %). 5 g filter aid and clarifying agent (kieselguhr, active carbon) were added, the diazonium salt solution was filtered and made up with water to 2000 ml. The nitrite in excess was practically completely decomposed by means of amidosulfuric acid (H₂N—SO₂OH), and the diazonium salt solution was stored at 5° C. in container (10).

75 g β-naphthol (0.521 mol) was dissolved in container (11) in 500 ml water and 186 ml sodium hydroxide solution (25 wgt %), the solution was cooled to 10° C. and made up to 1500 ml. This solution from container (11) was introduced within 2 hours jointly with a solution (coming from line 12) of 24 g phosphoric acid (85 wgt %) as a buffering substance in 500 ml water into mixer (13); a portion of the coupling component precipitated as reactive matter.

The material coming from mixer (13) was introduced into mixer (14) and mixed at 10°–15° C. with the diazonium salt solution from container (10). The product was taken from mixer (14) through line (15) and collected in collecting tank (16). The residence time was 6 seconds in mixer (13) and 2 seconds in mixer (14).

The mixing operation in mixer (14) was promoted by means of a stream of auxiliary material recycled from collecting tank (16) through recycle line (17) into mixer (14); the auxiliary material was used in a quantity (by volume) ten times larger than the quantity (by volume) of the diazonium salt used per hour. Collecting tank (16) had initially been charged with 250 ml water diluting the auxiliary material recycled on starting the reaction.

A pH of 8.5–8.8 was metered in collecting tank (16) which was maintained by fine control of the mass streams of acid diazonium salt solution and alkaline coupling solution.

The conversion rate of diazonium component to desirable azo pigment was about 98% at the outlet of mixer (14); it became quantitative during a 0.6 minute post-reaction period.

The suspension was taken from collecting tank (16) through line (18), filtered and dried at 110° C.; the azo pigment so made was of high brillancy and obtained in a yield of 156 g (0.51 mol).

We claim:

1. A process for mixing azo pigments by subjecting a diazo component to an azo coupling reaction with the equivalent quantity of a coupling component difficultly soluble at less than 65° C. in the aqueous/acid and aqueous/neutral pH-ranges, which comprises: continuously mixing, in a first reaction step, an aqueous/alkaline solution of the coupling component with an aqueous solution of an acid selected from the group consisting of acetic acid, boric acid, phosphoric acid, hydrochloric acid or sulfuric acid at a temperature lower than 65° C. and within a period of less than 1 minute, during which the coupling component commences precipitating at least partially as reactive matter; continuously mixing, in a second reaction step immediately following the first reaction step, the suspension obtained with an aqueous/acid solution of the diazo component and with a recycled aqueous suspension of produced azo pigment at a temperature of less than 65° C. within a period of less than 6 seconds, and establishing a predetermined pH between 2 and 9 by controlling the flow of the mass streams of the diazo component and coupling component and thereby causing a portion of the coupling component to undergo immediate reaction to the azo pigment to be made; and reacting the balance portion of the coupling component in a post-reaction phase with unreacted diazo component to the azo pigment to be made.

2. A process as claimed in claim 1, wherein the coupling component is selected from the group consisting of 2-hydroxy-3-naphthoic acid anilide, β-naphthol, and acetoacetic acid-o-aniside, and the diazo component is selected from the group consisting of 2,5-dichloroaniline, 2-chloro-4-nitroaniline, 5-nitro-2-aminoanisole, and 3-nitro-4-aminotoluene.

3. The process as claimed in claim 1, wherein a buffering substance contributing to establishing the predetermined pH is added during the second reaction step.

4. The process as claimed in claim 1, wherein 60 to 98% of the coupling component undergoes immediate reaction to the azo pigment to be made, in the second reaction step.

5. The process as claimed in claim 1, wherein the temperature during the azo coupling reaction including the post-reaction phase is 10° to 55° C. during the second reaction step.

6. The process as claimed in claim 1, wherein, depending on its chemical composition, the reactive coupling component precipitated during the first reaction step has an enolate, phenolate or naphtholate group fixed to the surface of its particles.

* * * * *